Sept. 10, 1963     L. G. ROLLINS     3,103,275
CONVEYOR DEVICE
Filed June 17, 1960
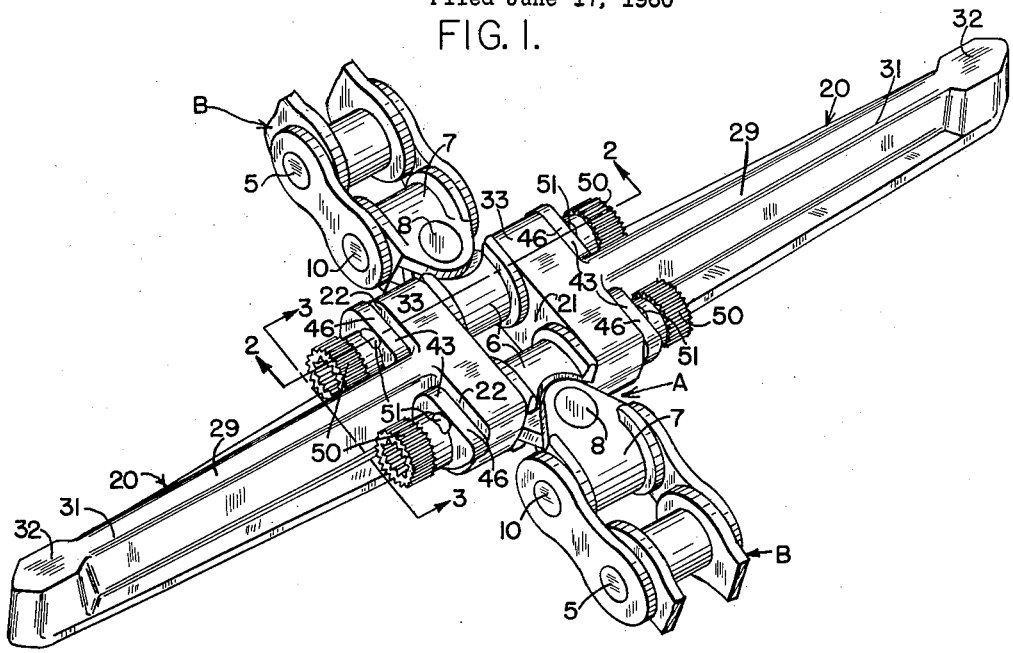
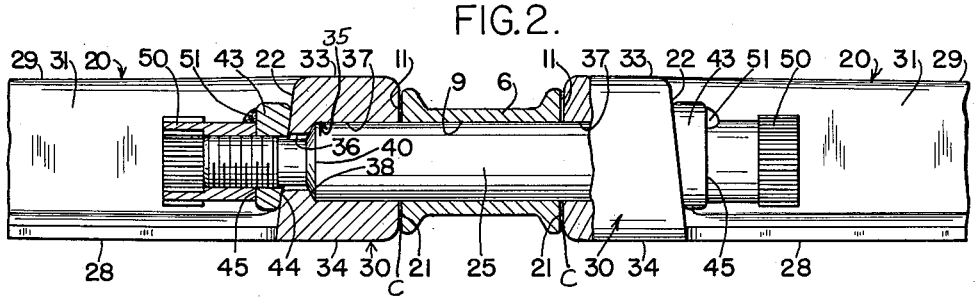
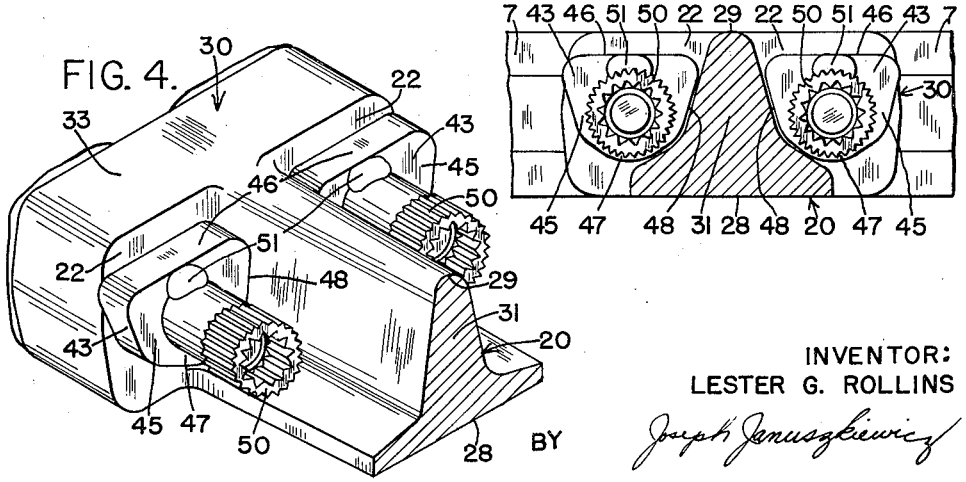
INVENTOR:
LESTER G. ROLLINS
BY Joseph Januszkiewicz
ATTORNEY

United States Patent Office 3,103,275
Patented Sept. 10, 1963

3,103,275
CONVEYOR DEVICE
Lester G. Rollins, Franklin, Pa., assignor to Joy Manufacturing Company, Pittsburgh, Pa., a corporation of Pennsylvania
Filed June 17, 1960, Ser. No. 36,838
10 Claims. (Cl. 198—176)

This invention relates to a conveyor device and more particularly to a flight conveyor having a novel structure for mounting the flight to a chain assembly.

Conveyor devices comprising a central chain with elongated flights extending laterally oppositely from opposite sides of the central chain are extensively used for the conveying of material. These types of conveyor devices are used in conjunction with flat surfaces over which they travel, wherein the laterally extending flights cooperate with the flat surfaces or deck to move material therealong. Where such conveyor devices are used on loading machines, the flights are required to move heavy materials such as large masses of coal, rock, iron ore, etc. which large masses of material are moved along the deck plates by the conveyor flights. In such structures the chain flights travel closely to the decks and are frequently in contact with the deck plates so that breakage of the flights occurs due to the heavy bending stresses or sudden jarring such as where large chunks of material drop from above onto the flights. In view of these conditions it is desired that the conveyor device having the chain portion as strong as possible and that the scraper flights be connectable to the chain in an effectively rigid manner and at the same time in a manner so that the scraper flights may be readily replaced. It is further desirable, since the flights are to be replaced, that the scraper flights be firmly and securely maintained in their adjusted position and that rugged connections be used to maintain the flights in position.

Prior known conveyor devices with scraper flights have used stud bolts or pins threaded at both ends wherein each end is also provided with recessed shoulders for spacing the flights connected thereto. The difficulty encountered was that the nuts would work loose thereby permitting the flights to set up concentrated stresses which caused the flights or bolts to fail. In addition the shoulders being notched or recessed would set up undesirable stresses at weak points of structure and thereby cause premature failure across the shoulders of the stud. A further refinement on scraper flights used a tapered end stud bolt to properly locate the flights, however, the tolerance requirements are high and difficulty in alignment along with undesirable stresses are encountered if the high tolerances are not maintained.

The present invention provides a conveyor device with new and improved alignment and spacing of the scraper flights thus eliminating structural weaknesses while positively maintaining the scraper flights in fixed relationship to the stud bolts to minimize the stress concentrations for a longer useful life while permitting a greater degree of machining tolerances with ready replaceability of the scraper flights and its component parts.

Accordingly, one object of this invention is to provide a new and improved conveyor device of the scraper flight type having replaceable flights.

A further object of this invention is to provide a conveyor device having new and improved connecting means between replaceable flights and the chain or the flight moving means.

It is a further object of this invention to provide a new and improved conveyor chain having replaceable flight scrapers which are rigidly maintained in their fixed positions through the use of self-tightening lock means.

A further object of this invention is provide a new and improved conveyor chain having replaceable opposed flight scrapers with connecting means extending therebetween which connecting means employs tapered washers that cooperate with a tapered surface on the scraper flights, respectively, to securely maintain the scraper flights in operating position.

These and other objects of the invention will become more apparent upon consideration of the following detailed description of a preferred embodiment thereof, when taken in conjunction with the following drawings, in which:

FIG. 1 is a perspective view of a portion of a conveyor device constructed in accordance with the principles of this invention having a pair of scraper flights connected to a pair of universal joints of a suitable roller chain structure.

FIG. 2 is an enlarged cross sectional view of the conveyor device as shown in FIG. 1 taken on lines 2—2 thereof.

FIG. 3 is an enlarged cross sectional view taken on lines 3—3 of FIG. 1.

FIG. 4 is a perspective view of the structure shown in FIG. 3.

As is well known in the art, a flight conveyor chain comprises a plurality of elongated laterally spaced pairs of links B which pairs of links B are suitably pivotably joined at the ends thereof to adjacent pairs of links B by suitable laterally extending pins 5, respectively. In order to permit scraper flights, such as flights 20 constructed in accordance with the principles of this invention, to be connected to the chain, suitable universal joints A are connected between longitudinally spaced pairs of links B in suitable longitudinally spaced locations along the chain as desired. As is also known, each universal joint A has two generally cylindrical, tubular members 6 and 7 having laterally spaced parallel axes which extend transversely of the longitudinal axis of the conveyor chain. Each member 6 and 7 has cooperable portions extending laterally from the adjacent sides which portions are suitably horizontally pivotably connected together by a suitable vertically extending pin 8 which pin 8 also extends perpendicular to a plane that contains the axes of the tubular members 6 and 7. Each tubular member 6 and 7 has a cylindrical bore 9 that extends laterally therethrough (FIG. 2). As shown the tubular members 6 of each joint A are located adjacent each other and are connected to the scraper flights 20 as will be more fully explained hereinafter whereas tubular members 7 of each universal joint A are located remote from each other and are suitably pivotably connected to the chain links B by laterally extending elongated pins 10. In addition the adjacent tubular members 6 are provided with suitable coplanar annular surfaces 11 at each of their ends. Inasmuch as various suitable universal joints for such purpose are well known in the art further description thereof is not believed to be warranted.

Each scraper flight 20 comprises a rectangular cross sectional base portion 30 from which an integral elongated triangular cross sectional body portion 31 extends. The body portion 31 has an integral enlarged portion 32 at its outer end which may assume any desired shape or size. The base portion 30 of each scraper flight 20 has a vertically extending plane surface 21 at the end thereof remote from the portion 32 which surface 21 lies in parallel spaced adjacent relationship to the outer end coplanar annular surfaces 11 at one end of adjacent tubular members 6. The base portion 30 is trapezoidal in lateral cross section with an upper surface 33 being parallel with a lower surface 34 and to which surfaces 33 and 34 the vertically extending surface 21 is generally perpendicular. The base portion 30 is provided with a slanting side 22 opposite to the vertically extending plane surface 21 which side 22 tapers generally downwardly and outwardly from the vertical. It will be understood that the directions such as vertical, horizontally and downwardly are relative terms and are used when viewing FIGS. 2 and 3 in their normal position as shown and that the inventive concept as applied herein can be used in directions other than that specified. The directions used are for convenience and ease of understanding. The trapezoidal lateral cross sectional base 30 presents an upper surface 33 of less width than the lower surface 34.

Extending laterally centrally outwardly from the slanting side 22 of each base 30 is the elongated body portion 31 which is generally triangular in lateral cross section (FIG. 4). The apex 29 of the triangular shaped body portion 31 extends on the same plane as the upper surface 33 of the base portion 30 whereas the lower surface of the base portion 28 of the triangular shaped body portion 31 extends on the same plane as the lower surface 34 of the base portion 30. It will be understood that the heretofore described configuration of the flight 20 may be varied without departing from the scope of the invention. As shown, the sides of the body portion 31 diverge downwardly and outwardly toward the base portion 28, however, the contour of the diverging sides of the portion 31 may be concave or variations thereon as desired. The specific embodiment shown in FIG. 4 discloses the sides of the portion 31 diverging generally downwardly and gradually merging into the upper surface of the base portion 28 and thereafter the upper surfaces of base portion 28 diverge generally outwardly and gradually downwardly.

The base portion 30 of each flight 20 is also provided with a pair of spaced parallel stepped bores 35 extending therethrough whose axes are normal to the surface 21 and which bores 35 are located on opposite sides of the body portion 31 respectively. Each bore 35 has a reduced diameter bore portion 36 intersecting and extending inwardly from the slanting side 22 and an enlarged diameter bore portion 37 intersecting and extending inwardly from the abutting surface 21 into axial alignment with the bore portion 36. The juncture of the enlarged bore portion 37 of bore 35 with the reduced bore portion 36 is formed to provide a suitable annular shoulder 38 for a purpose to be described.

To properly assemble a pair of scraper flights 20 to opposite sides of a universal joint A, respectively, the bores 35 of each scraper flight 20 are laterally spaced so as to be aligned with the respective bores 9 of the adjacent tubular members 6 of a universal joint A. When assembled the vertically extending surface 21 of each opposed scraper flight base portion 30 lies closely adjacent the respective outer coplanar annular surfaces 11 of the adjacent tubular members 6 leaving a clearance space "c" therebetween for a purpose to be described. Elongated stepped pins or stud bolts 25 (FIG. 2) each having threaded ends of reduced diameter and a diametrically enlarged intermediate portion are press fitted into the respective opposed and aligned bores 35 of the base portions 30 and a sliding fit with the bores 9 of the tubular members 6 in alignment therewith. The junctures of the enlarged portion of each stepped pin or stud bolt 25 with the reduced portions of the pin or stud bolt 25 provides longitudinally spaced shoulders 40 which engage the opposed annular shoulders 38 in the bores 35 of opposed base portions 30 to locate the opposed flights 20 with respect to the pins 25. The shoulders 38 of bore 35 thus determines to what extent to which the scraper flights 21 will be press fitted onto pins 25. Thus the shoulders 38 of the respective opposed scraper flights 21 engaging the respective spaced pairs of pins 25 establishes the clearance space "c" between each vertically extending surface 21 of each opposed scraper flight base portion 30 and the respective adjacent outer coplanar annular surfaces 11 of tubular members 6. It will be understood that the clearance space "c" may be suitably varied to provide sufficient moving clearance so that where a sprocket drives the chain links and the accompanying scraper flights 20 thereby; relative movement between the pairs of driven chain links including universal joints A and the respective pins 25 along with their supporting scraper flights 20 will be permitted to prevent binding as the chain links and scraper flights 20 pass over a sprocket. The press fit of the scraper flight 20 onto pin 25 distributes the stresses as will be more fully understood by the description given hereinafter. It will be noted that the threaded end of each pin or stud bolt 25 extends a suitable distance beyond each slanting surface 22 of the base 20 for a purpose to be described.

A suitably contoured tapered wedge shaped washer 43 acting as a filler (FIG. 2) is placed on each reduced portion of each pin 25 with side surfaces 44 thereof abuttingly engaging the complementary slanting surfaces 22 of the base portion 30, respectively. Each wedged shaped washer 43 is axially larger at the top than at the bottom and has an outer surface 45 remote from the surface 44 which surface 45 is generally vertical and parallel to the surfaces 21 of the base portions 30 when the washers 43 are located on the pins 25. Suitable nuts 50 are threaded onto the threaded ends of the pins 25 whereby the annular base surfaces of the nuts 50 suitably abuttingly engage the planar surfaces 45 of the tapered washers 43, respectively, to wedge the surfaces 44 into complementary abutting engagement with the slanting sides 22 of the base portions 30 with spaced shoulders 40 abutting annular shoulders 38 respectively to thereby rigidly secure the scraper flights 20 to the pins 25 and thus provide a unitary scraper flight structure which distributes the stresses and avoids concentration thereof and yet provides readily replaceability.

In addition, each tapered washer 43 has a substantially inverted triangular peripheral shape with a top surface 46 and two converging side surfaces 48 which surfaces 48 terminate into an apex 47. The base surface 46 is thicker in cross section than the apex 47 as explained above. With such structure one side surface 48 of each washer 43 abuttingly engages (see FIG. 3) in complementary relationship the adjacent side surfaces of the diverging sides of the trianagular shaped body portions 31 of the scraper flights 20, respectively, to more rigidly secure the scraper flight 20 to the chain. Thus the tapered washers 43 are prevented from turning because of the surfaces 44 being wedged against the slanting surfaces 22 of base portions 30 and the side surfaces 48 engaging the sides of the body portion 31 of the scraper flights 20 respectively with axial relative movement being prevented by abutting shoulders 40 and 38 respectively on pins 25 and bore 38 of scraper flights 20 respectively. Thus any action tending to rotate the nut 50 exerts a force on the complementary engaging surfaces which correspondingly resists any tendency of the scraper flights to move from their relative position with respect to their adjacent universal joints A.

If desired, to further secure the scraper flights 20 in their respective oriented positions, the tapered washers 43 can be suitably welded such as by a tack weld 51 to the adjacent nuts 50 to thereby prevent the nuts 50 from rotating and thereby positively insuring that there will be no accidental separation of parts, but rather a unitary cooperating structure which will permit easy replacement by suitably breaking the tack welds 51 to permit replacement of the scraper flights 20. As shown the nuts 50 are preferably suitably contoured such as by providing cylindrical end portions which are suitably longitudinally serrated on their inner and outer surface portions so that a suitable tool may grasp the ends thereof for quick removal.

Thus the facile manner of assembling the scraper flights, pins and chain assembly by providing a novel spacing means for the relative stationary flights and pins with respect to the chain reduces the stress concentrations with positive alignment at all times yet maintaining replaceability without undue rise in manufacturing costs or tolerances assures a more economical conveyor means.

Having described a preferred embodiment of this invention in accordance with the patent statutes, it is to be realized that modifications thereof may be made without departing from the broad spirit of this invention. Accordingly it is respectfully requested that this invention be interpreted as broadly as possible and as limited only by the prior art.

What I claim is:

1. A conveyor device comprising, a universal joint structure having two units arranged in side to side relationship, each of said units comprising a pair of elements pivotally connected in adjacent relationship to swivel in one plane, adjacent elements of said two units being spaced apart to receive a sprocket tooth between them, a pair of spaced members extending along the outer ends respectively of and connected respectively to the adjacent ends of said adjacent spaced elements, at least one of said members comprising a conveyor flight having an integral arm portion extending outwardly therefrom, said connection having means for spacing said members with respect to said adjacent elements, and tapering lock means cooperative with a portion of said flight to maintain said flight in aligned relationship.

2. A conveyor device comprising, at least a pair of units arranged end to end, each of said units comprising a pair of elements pivotally connected to swivel in one plane, adjacent elements of said pair of units being spaced apart to receive a sprocket tooth between them, a pair of conveyor flights extending outwardly respectively from the opposite sides of adjacent elements, the adjacent portions of said adjacent elements and said flights having continuous apertures extending transversely therethrough, pivot pins extending through said elements and said flights through said apertures respectively, said pins journaled in said elements respectively to provide for the swiveling of said units transversely of said plane, said pins having means thereon for spacing said flights with respect to each other and said elements, and tapering lock means located on the respective ends of said pins engaging said flights to form a rigid unitary structure with said pins.

3. A conveyor device as set forth in claim 2 wherein said tapering lock means includes a tapered washer that engages a complementary tapered surface on said adjacent flight.

4. A conveyor device as set forth in claim 3 wherein each of said tapered washers are welded respectively to their adjacent lock means.

5. In a conveyor chain, units arranged end to end but spaced apart to receive a sprocket tooth between them, each of said units having an aperture extending transversely of the length of the chain and in the end of each unit adjacent the other unit, a pivot pin journaled directly in each of said apertures and projecting outwardly from the sides of the associated unit, conveyor flights extending transversely of the chain from opposite sides thereof and each having a base extending along side the adjacent ends of said two units, said pins extending through said bases and having their ends receiving a tapered washer respectively thereon engaging a complementary tapered portion of said conveyor flights, and securing means mounted on said ends of said pins outwardly of said tapered washers respectively and said securing means being welded to the adjacent ones of said tapered washers to form a rigid structure.

6. In a conveyor chain universal joint structure, two units arranged end to end, each unit comprising a pair of elements and an upright pin pivotally connecting them, parallel members extending along the outer sides of one end of an element of one unit and along the outer sides of the adjacent end of one element of the other unit, each of said parallel members having a base with a first planar surface engaging said adjacent outer sides of said adjacent end elements, transverse pins extending through the ends of said members and through the corresponding ends of the elements between them to pivotally connect said structures, each of spaced said members having a pair of second planar surfaces on said base at an offset angle to said first planar surface, each of said members having an arm extending transversely of the length of said universal joint structure and between the axes of the associated pins, said arm extending from the juncture of said pair of second planar surfaces, each end of each of said transverse pins has means secured thereon including a tapered washer complementary engaging said second planar surfaces respectively to form a rigid structure.

7. In a conveyor chain universal joint structure, two pairs of elements arranged in alignment, said pairs of elements, having adjacent ends spaced apart to receive a sprocket tooth between them, an upright pin pivotally connecting the elements of each pair to provide for their relative swivelling in one plane, each element of said pairs of elements having outer side surfaces defining a pair of parallel planes normal to said first mentioned plane, a pair of conveyor flight members at the opposite sides of the chain, each of said flight members having a base extending along said outer side faces of the end portions of said adjacent elements to define a first planar surface, parallel spaced transversely extending pins connecting said members to said adjacent elements respectively, each of said members having a pair of second planar surfaces on said base at an offset angle to said first planar surface extending in the same general planar direction as said first planar surface, each of said members having an arm extending transversely of the length of said universal joint structure and between the axes of said transversely extending pins, said arm extending outwardly from the juncture of said pair of second planar surfaces, each end of each of said transverse pins has means secured thereon including a tapered washer complementary engaging said second planar surfaces respectively to form a rigid structure, said pins lie normal to said first planar surfaces, and means mounted on the respective ends of said pins having a complementary surface to engage said tapered washers respectively to form a rigid structure.

8. In a conveyor chain, spaced elements arranged end to end to receive a sprocket tooth between them, each of said elements having spaced parallel outer planar side surfaces, a pivot pin extending through each of said elements and normal to said outer sides of each of said element thereof a distance exceeding the over-all width of said element, conveyor flights extending outwardly from opposite sides of the chain and each of said flights having a base with a first planar surface extending alongside the adjacent outer sides of said elements and having spaced apertures for receiving said pins, said base having a second planar surface spaced from said first planar surface diverging slightly from said first planar surface, means secured to the respective outer ends of said pins having a tapering surface that is complementary to said diverging second planar surface to thereby secure said flights to said elements.

9. A conveyor chain having chain elements spaced apart to receive a sprocket tooth between them, pivot pins passing through said elements and projecting from the opposite sides thereof, side links one at each side of said chain elements and traversed near their opposite ends by said pivot pins, said pins retain said side links and chain elements together, a pair of conveyor flights extending outwardly from the opposite sides of said links, means detachably securing said flights to said opposite sides of said chain respectively wherein each of said means includes a portion having tapering surface that engages a complementary tapering surface on the adjacent flights to thereby securely lock said flights to said chain elements and prevent relative movement therebetween.

10. A conveyor chain as set forth in claim 9 wherein said securing means includes a nut threadedly secured to said pin with said nut rigidly secured to said portion of said securing means having said tapering surface.

References Cited in the file of this patent

UNITED STATES PATENTS

| | | |
|---|---|---|
| 660,084 | Smith | Oct. 16, 1900 |
| 1,904,296 | Royse | Apr. 18, 1933 |
| 2,450,501 | Clarkson | Oct. 5, 1948 |
| 2,889,916 | Price | June 9, 1959 |

FOREIGN PATENTS

| | | |
|---|---|---|
| 1,023,402 | Germany | Jan. 23, 1958 |